A. W. STOKER.
APPARATUS FOR THE MANUFACTURE OF SHEET METAL CANS OR BOXES.
APPLICATION FILED JAN. 18, 1908.
949,406.
Patented Feb. 15, 1910.
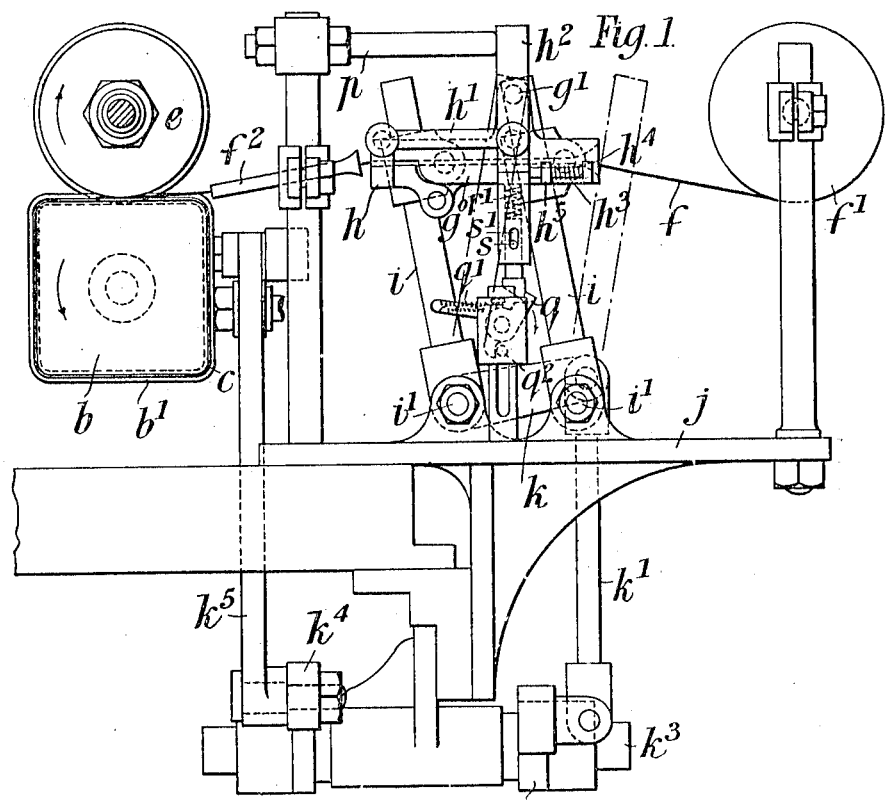
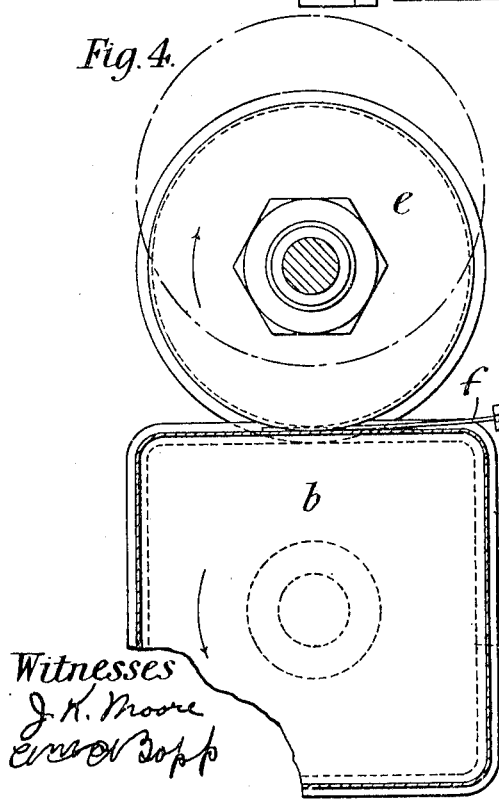
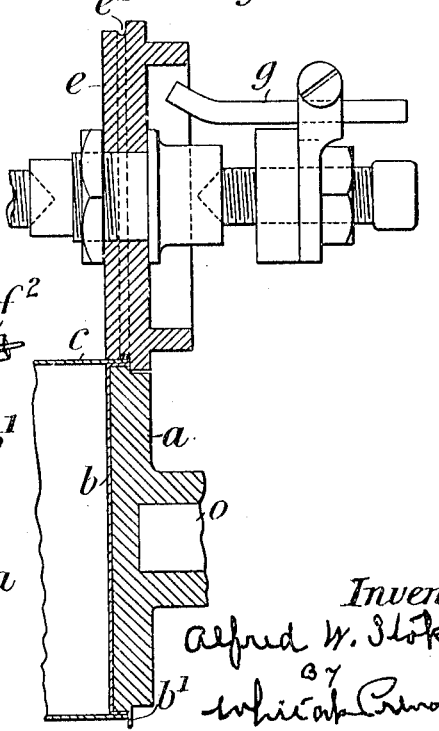

A. W. STOKER.
APPARATUS FOR THE MANUFACTURE OF SHEET METAL CANS OR BOXES.
APPLICATION FILED JAN. 18, 1908.
949,406.
Patented Feb. 15, 1910.
3 SHEETS—SHEET 2.
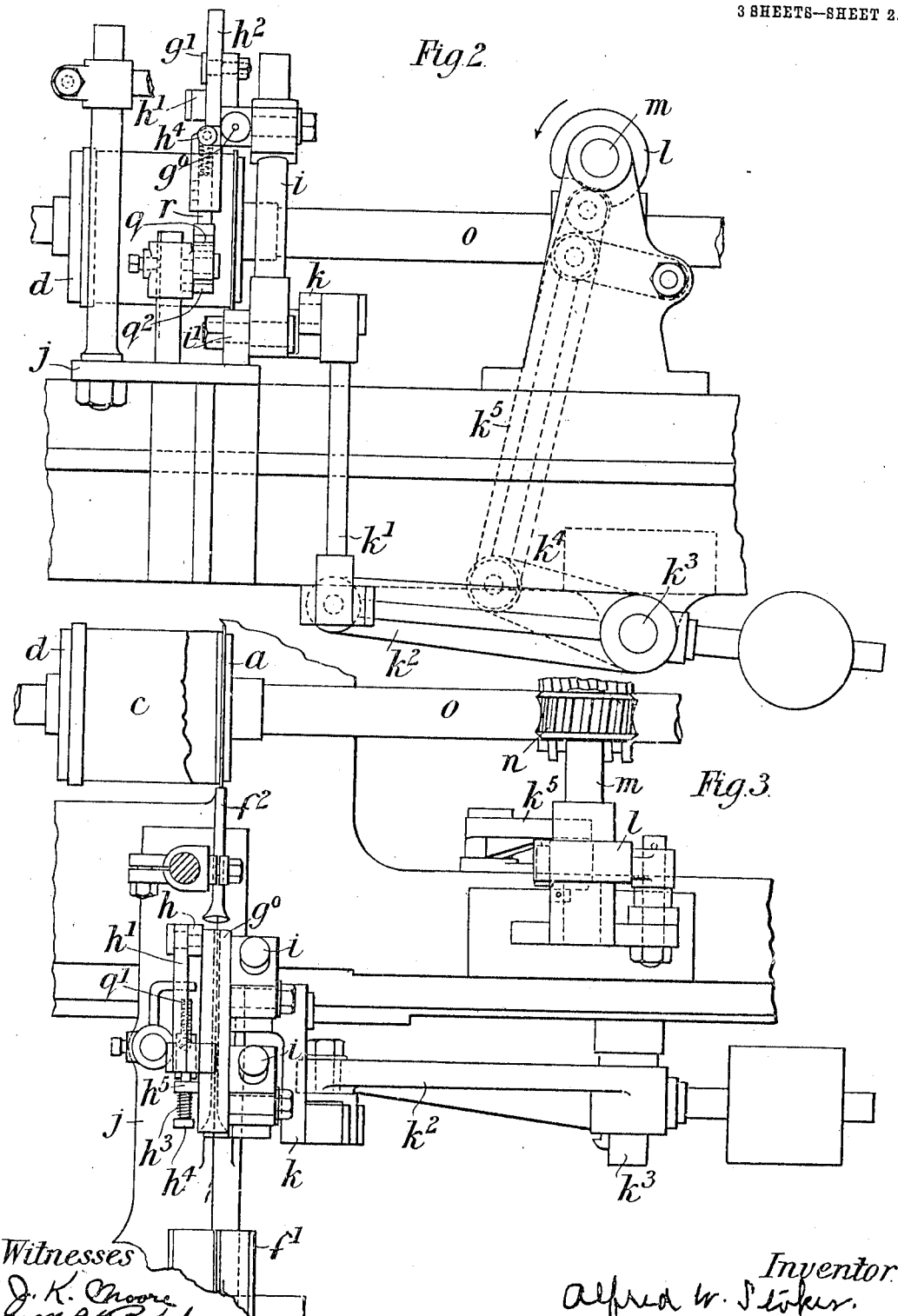

A. W. STOKER.
APPARATUS FOR THE MANUFACTURE OF SHEET METAL CANS OR BOXES.
APPLICATION FILED JAN. 18, 1908.

949,406.

Patented Feb. 15, 1910.

3 SHEETS—SHEET 3.

Witnesses
R. E. Barry
J. K. Moore

Inventor
Alfred W. Stoker

UNITED STATES PATENT OFFICE.

ALFRED WASHINGTON STOKER, OF LONDON, ENGLAND.

APPARATUS FOR THE MANUFACTURE OF SHEET-METAL CANS OR BOXES.

949,406.      Specification of Letters Patent.      Patented Feb. 15, 1910.

Application filed January 18, 1908. Serial No. 411,522.

*To all whom it may concern:*

Be it known that I, ALFRED WASHINGTON STOKER, a subject of the King of Great Britain, residing at Muscovy House, 6 Trinity Square, London, England, have invented new and useful Improvements in Apparatus for the Manufacture of Sheet-Metal Cans or Boxes, of which the following is a specification.

My invention relates to the manufacture of sheet metal cans or boxes and especially to apparatus for cans of the kind provided with seamed joints, the object of my invention being to provide means whereby the soldering of the joint may be effected simultaneously with the seaming.

According to my invention I provide for introducing solder into the joint adjacent to the seaming tools or rollers. This may be effected by running a ribbon or strip into the joint at the same time that it is turned over and by applying sufficient heat to the can adjacent to the seaming tools to melt the solder.

Figure 6:
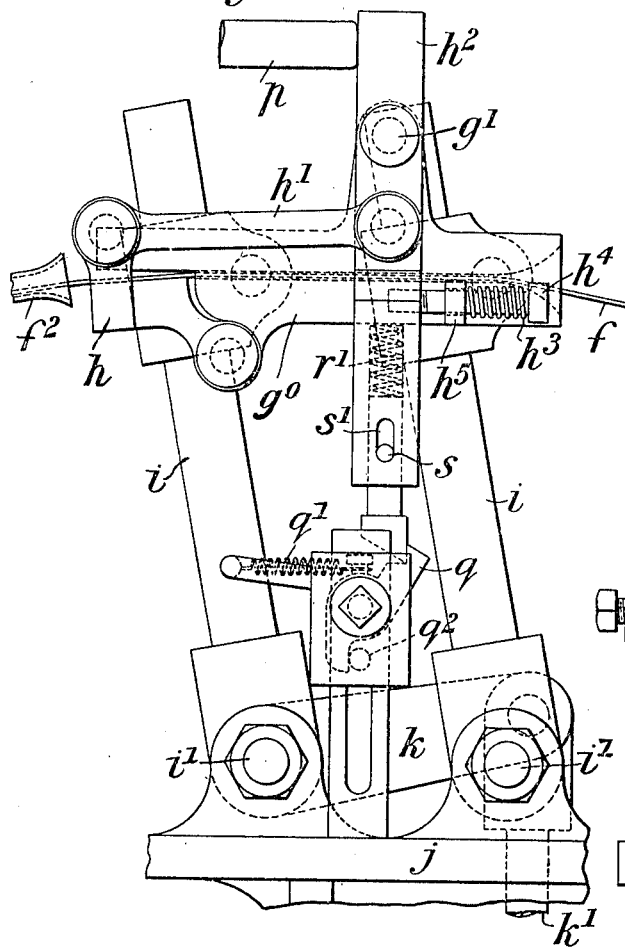
Figure 7:
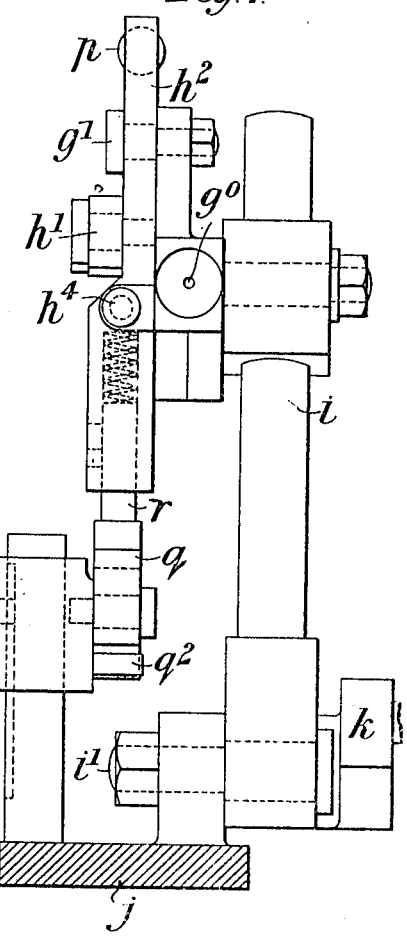
Figure 8:
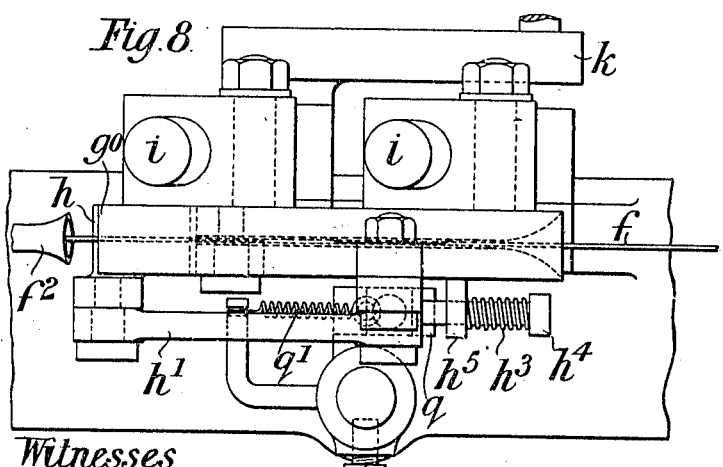

In the accompanying drawing:—Figure 1 is an elevation of apparatus constructed according to the invention for attaching the ends or bottoms to tin boxes, cans, canisters or the like. Fig. 2 is a partial elevation at right angles to Fig. 1 and Fig. 3 is a plan thereof. Fig. 4 is a front view of the chuck and soldering plate. Fig. 5 is a sectional view at right angles to Fig. 4. Figs. 6, 7 and 8 are views similar to Figs. 1, 2 and 3 respectively of the mechanism for feeding the strip of solder into position and withdrawing its severed end, as hereinafter described. Figs. 4 to 8 inclusive are drawn to a larger scale than Figs. 1 to 3.

$a$ is the chuck for the reception of the bottom $b$ and the end of the body $c$ of a box to which the bottom is to be connected, $d$ is the clamping plate for holding the body $c$ against the upturned flange $b^1$ of the bottom $b$ and $e$ is the rolling-on plate having the groove $e^1$ for turning over or beading the flange $b^1$ on to the body $c$, all of which parts are of usual construction.

$f$ is a strip or wire of solder designed to be inclosed by the beaded flange $b^1$. To melt the solder and secure the flange $b^1$ to the body $c$ of the box, I advantageously heat the plate $e$ by gas through the medium of a pipe $g$ secured to a part of the framing carrying the said plate, the latter being recessed at the back so as to inclose the mouth of the pipe and form a kind of heating chamber, as shown clearly in Fig. 5.

The strip $f$ of solder is fed from a spool $f^1$ through a guide $f^2$ into position beneath the groove $e^1$ of the plate $e$ when the latter is in its raised or normal position, indicated by the dotted lines in Fig. 4, the said plate being then lowered and together with the chuck $a$ revolved in the direction of the arrows, Figs. 1 and 4, in the usual manner, so that the upturned flange $b^1$ of the bottom $b$ will be turned down and inclose the solder which will be drawn from the spool $f^1$ by the rotation of the chuck $a$, the completion of the closing down of the flange $b^1$ when the chuck has made a complete revolution severing the strip of solder.

For feeding the strip of solder into position beneath the plate $e$ and withdrawing its severed end out of the way when removing a treated box and placing another one in position to be treated I employ the following mechanism, that is to say, I arrange an additional guide $g^0$ for the solder between the guide $f^2$ and the spool $f^1$, the said guide $g^0$ being provided with a pivoted jaw $h$ to grip the solder and being adapted to be reciprocated to impart the required movement to the solder. The jaw $h$ is caused to grip the solder against the guide through the medium of a link $h^1$ pivoted to said jaw and to the lever $h^2$, the latter being pivoted to the guide $g^0$ at $g^1$, and a spring $h^3$. This latter is arranged between the head of a pin $h^4$ on the lever $h^2$ and extending through a lug $h^5$ on the guide $g^0$ and tends to move the lever $h^2$ to the right in Fig. 1, causing it to draw on the link $h'$ and close the jaw $h$. The guide $g$ is pivoted to two equal arms $i$, $i$ which are themselves pivoted at $i^1$, $i^1$ to the frame or table $j$ of the machine so that when one of the arms $i$ is oscillated the guide $g$ is reciprocated and at the same time maintains its parallelism with the said frame or table. The oscillation of the arms $i$, $i$ is advantageously effected by a crank $k$ connected to the pivot of one of the said arms, a connecting rod $k^1$, a counterweighted crank $k^2$, a shaft $k^3$, a crank $k^4$, a rod $k^5$ and a cam $l$ against which a roller on the rod $k^5$ bears, the said cam being carried on a shaft $m$ operated by worm gear $n$ from the shaft $o$ carrying the chuck $a$. The counterweight tends to maintain the roller on the rod $k^5$ in contact with the cam.

In order that when the guide $g^0$ is in its forward position, as shown in the drawings, the jaw $h$ shall be free of the solder to enable the latter to be drawn through the guide $g^0$ by the rotation of the chuck $a$ and plate $e$ I provide a stop $p$ against which the upper end of the arm $h^2$ will impinge and be moved slightly on its pivot to open the said jaw.

To insure that there shall be no break between the ends of the strip of solder around the box I prefer to apply it in such a manner that the ends overlap and for this purpose I arrange that during the first part of the backward movement of the guide $g^0$ the jaw $h$ shall be open so that the guide moves without carrying the solder with it, the duration of time that the jaw is open determining the amount of overlap of the ends. For this purpose I employ a spring catch $q$, shown clearly in Fig. 1, which is free to move in the direction of the arrow against the pull of a spring $q^1$ but is limited in the opposite direction by a stop $q^2$. This catch $q$ when the guide is in its forward position, as shown, engages behind the end of a rod $r$ arranged to slide in the lower end of the lever $h^2$ against the pressure of a spring $r^1$ and limited in its downward movement by a pin $s$ on the rod $r$ engaging a slot $s'$ in the lever. By this arrangement it will be seen that when the guide $g^0$ moves back, the engagement of the rod $r$ with the catch $q$ will turn the lever $h^2$ on its pivot and open the jaw wider, the resistance of the spring $q'$ being greater than of the spring $h^3$. When the guide $g^0$ has reached a predetermined position, the rod $r$ will escape from the catch $q$ so that the jaw $h$ will close and grip the solder and carry it back with the guide. The distance the guide moves back without carrying the solder with it is the distance that the ends of the solder applied to the box or the like will overlap. When the guide again moves forward the end of the rod $r$ will ride over the catch $q$ and again engage therewith, the said rod being beveled to facilitate this action.

In the operation of the apparatus the solder wire being in the position shown in Figs. 1 and 4, that is to say with its end beyond the point of contact between the chuck $a$ and plate $e$, and the plate $e$ having been moved down from the position shown in dotted lines in the latter figure, the said chuck and plate are then revolved in the usual way, the upturned flange $b'$ being turned over to inclose the solder and, when the chuck has completed a revolution, severing the wire at about the point of contact between the chuck $a$ and plate $e$. The plate $e$ heated by the gas jet $g$ will during the above described operation impart its heat to the parts in contact therewith and melt the solder, the said plate and chuck $a$ continuing to revolve after the closing of the bead to insure the thorough melting of the solder. The plate $e$ and chuck $a$ then stop revolving and the former is lifted to its normal position in the usual way the wire strip $f$ being moved back by the guide $g^0$ in the manner hereinbefore described to allow of placing another box body and bottom in position when the guide $g^0$ is again moved forward to place the strip $f$ in position and the plate $e$ again moved down on to the chuck $a$ and so on.

Although I have described my invention in connection with the attachment of the ends or bottoms of tin boxes or the like I do not confine it to such operations but I can also form the seams of the bodies of such boxes or the like in a similar manner and although I have described the plate $e$ as being heated by gas it or other equivalent tool employed may be heated in any other convenient manner, for instance, by oil or electricity.

Instead of introducing the solder in the form of a ribbon or strip as hereinbefore described the solder may be squirted into the seam.

In some cases I may provide for introducing a metallic paste or solution into the seam at the moment of turning it over, the necessary heat being of course applied to cause the required adhesion of the surfaces.

Having now particularly described and ascertained the nature of my said invention and in what manner the same is to be performed, I declare that what I claim is:—

1. In a machine for manufacturing sheet metal receptacles, having seamed joints, the combination with the roller for rolling the ends onto the body, of means for introducing solder into the seams and means for heating the roller.

2. In a machine for manufacturing sheet metal boxes having seamed joints, the combination with means for holding the body of the box, of a roller for rolling the ends onto said body, means for introducing solder into the seams and means for heating the roller.

3. In a machine for manufacturing sheet metal receptacles having the ends seamed thereon, the combination with means for holding the body of the receptacle, of a roller for rolling the ends onto the body, a guide directing solder into the seam, means for feeding the solder to said guide and means for heating said roller.

4. In a machine for manufacturing sheet metal receptacles, the combination with means for holding the main body of the receptacle, of a roller for rolling the ends onto the main body, means for introducing solder in the shape of a wire into the seam including a guide and means for advancing the wire of solder through said guide and means for heating said roller.

5. In a machine for manufacturing sheet metal receptacles having heads seamed thereon, the combination with means for holding and rotating the main body, a roller for seaming the ends onto the main body, a guide for directing a wire of solder into the seam, in advance of the roller, means for heating said roller and means for moving said wire of solder in both directions through the said guide.

6. In a machine for manufacturing sheet metal receptacles, the combination with a mandrel provided with means for holding the body of said receptacle, a roller for rolling the ends onto said receptacle, a fixed tubular guide for directing a wire of solder into the seam in advance of said roller, means for heating said roller and means for feeding said solder wire to said fixed tubular guide.

7. The combination with means for rolling and soldering the ends on sheet metal receptacles, of a fixed guide for directing a wire of solder into the seam, a guide for feeding said wire of solder, said feeding guide being provided with a movable jaw and means for clamping said jaw upon the solder wire when it is desired to move said solder wire in either direction.

8. In a machine for soldering the ends onto sheet metal receptacles, the combination with a fixed guide to deliver a solder wire into the seam at one end of the receptacle, of a movable guide having a clamping jaw for feeding said solder wire to said fixed guide, means for moving said movable guide toward and from the fixed guide and means for holding said clamping jaw against said soldering wire on its movement toward the fixed guide.

9. In a machine for soldering the ends onto sheet metal receptacles, the combination with a fixed guide to deliver a solder wire into the seams at one end of the receptacle, of a movable guide having a clamping jaw, means for moving the movable guide toward and from the fixed guide, means for holding said jaw to clamp the wire while the feeding guide is moving toward the fixed guide and means for holding the fixed jaw in contact with said solder wire during a part of its return movement.

10. In a machine for soldering the ends onto sheet metal receptacles, the combination with a fixed guide to deliver a solder wire into the seams at one end of the receptacle, of a movable guide having a clamping jaw, means for moving said movable guide toward and from the fixed guide, means for holding said clamping jaw against said wire during its movement toward the fixed guide, means for holding said clamping jaw away from said wire during a further feed of the same, means for applying the clamping jaw to the wire for part of its return movement.

ALFRED WASHINGTON STOKER.

Witnesses:
JOHN E. BOUSFIELD,
C. G. REDFERN.